United States Patent

Savant

[11] Patent Number: 6,158,245
[45] Date of Patent: Dec. 12, 2000

[54] HIGH EFFICIENCY MONOLITHIC GLASS LIGHT SHAPING DIFFUSER AND METHOD OF MAKING

[75] Inventor: Gajendra D. Savant, Torrance, Calif.

[73] Assignee: Physical Optics Corporation, Torrance, Calif.

[21] Appl. No.: 09/139,379

[22] Filed: Aug. 25, 1998

Related U.S. Application Data

[63] Continuation-in-part of application No. 08/902,415, Jul. 29, 1997.

[51] Int. Cl.[7] .................................................. C03B 8/02
[52] U.S. Cl. ........................................................ 65/17.2
[58] Field of Search ............................................. 65/17.2

[56] References Cited

U.S. PATENT DOCUMENTS

| | | | |
|---|---|---|---|
| 3,597,252 | 8/1971 | Schroder et al. | 501/12 |
| 3,640,093 | 2/1972 | Levene et al. | 65/134 |
| 5,264,197 | 11/1993 | Wang et al. | 423/338 |
| 5,368,887 | 11/1994 | Hoshino et al. | 427/226 |
| 5,384,571 | 1/1995 | Myers et al. | 342/4 |
| 5,534,386 | 7/1996 | Petersen et al. | 430/320 |
| 5,538,674 | 7/1996 | Nisper et al. | 264/1.31 |
| 5,609,939 | 3/1997 | Petersen et al. | 428/141 |
| 5,766,680 | 6/1998 | Schmidt et al. | 427/226 |
| 5,861,113 | 1/1999 | Choquette et al. | 264/1.24 |

FOREIGN PATENT DOCUMENTS 61-68314  4/1986  Japan .

OTHER PUBLICATIONS

Lukosz et al, "Embossing technique for fabricating integrated optical components in hard inorganic waveguiding materials", Optics Letters, vol. 8, No. 10, pp. 537–539, Oct. 1983.

Shagam, R.N., Ph.D., "Light Shaping Diffusers™ Simplify Aircraft Inspection," *Photonics Spectra,* Nov. 1994.

Dusinberre, B., "Light Shaping Diffusers Enhance Depth–Finder Performance," *Laser Focus World,* Jun. 1995.

Szczesniak, S., & Shie, R., "Machine Vision for Semiconductor Manufacture," *Photonics Spectra,* Nov. 1995.

"Directional Turning Film™", Physical Optics Corporation, 1996, Brochure (No Month Available).

Giancola, S., "Hologrpahic Diffuser Makes Light Work of Screen Tests," *Photonics Spectra,* Aug. 1996.

Laine, J., "Mini Display," *Design News,* Dec. 15, 1997.

"Light Shaping Diffusers® Technical Data Sheet," Physical Optics Corporation, Jul. 1, 1998.

"Light Shaping Diffuser® Transmissive Thin Film Price List," Physical Optics Corporation, May 1, 1998.

"Light Shaping Diffuser® Transmission Kits Price List," Physical Optics Corporation, May 1, 1998.

"Light Shaping Diffuser® Transmission Sheet Price List," Physical Optics Corporation, May 1, 1998.

*Primary Examiner*—Sean Vincent
*Attorney, Agent, or Firm*—Nilles & Nilles, S.C.

[57] ABSTRACT

A surface light shaping diffuser (LSD) is formed from a monolithic glass material by recording light shaping structures on a surface of the material during its formation. A surface LSD is produced by embossing or molding light shaping structures onto a high quality optical glass or by embossing light shaping structures on a glass film layer coated onto a substrate. A rubber submaster carrying the light shaping structures is used as the master in such diffusers control the angular spread of transmitted light while homogenizing otherwise spatially noisy light sources such as LCDs and filamented light sources and while maintaining damage thresholds consistent with any glass optical element. The surface LSD has a transmission efficiency of over 90% from the Ultraviolet wavelengths through the physical spectrum and into the near-infrared.

23 Claims, 8 Drawing Sheets

HIGH EFFICIENCY MONOLITHIC GLASS LIGHT SHAPING DIFFUSER AND METHOD OF MAKING

This application is a continuation-in-part of Lieberman et al. U.S. application Ser. No. 08/902,415, filed Jul. 29, 1997, and assigned to the assignee of the present invention.

BACKGROUND OF THE INVENTION

1. Field of the Invention

The invention relates generally to light shaping diffusers, and more particularly, to a surface light shaping diffuser formed from a monolithic glass material and also to a method of forming the surface light shaping diffuser.

2. Description of the Related Art

A Light Shaping Diffuser™ (LSD®), sometimes known as a light shaping homogenizer or simply a diffuser, is a type of diffuser used in a variety of illuminating, imaging, and light projecting applications. A LSD is a transparent or translucent structure having an entrance surface, an exit surface, and light shaping structures formed on its entrance surface and/or in its interior. These light shaping structures are random, disordered, and non-planar microsculpted structures. These structures are created during recording of the medium by illuminating the medium with a speckle pattern produced in conjunction with coherent light or the combination of incoherent light and a computer-generated mask which simulates speckle. The speckle produce changes in the refractive index of the medium which, when developed, are the micro-sculpted structures. These light shaping structures diffract light passing through the LSD so that the beam of light emitted from the LSD's exit surface exhibits a precisely controlled energy distribution along horizontal and vertical axes. LSDs can be used to shape a light beam so that over 90% (and up to 95%–98%) of the light beam entering the LSD is directed towards and into contact with a target located downstream of the LSD. A LSD can be made to collect incoming light and either (1) distribute it over a circular area from a fraction of a degree to over 100°, or (2) send it into an almost unlimited range of elliptical angles. For example, a 0.2°×50° LSD will produce a line when illuminated by a LED or laser and a 35°×90° LSD will form a narrow field, high resolution rear projection screen when illuminated by the same light source.

Rather than exploiting a property of monochromatic laser light known as coherence that requires that the finished holographic element be used only at the laser's wavelength, a LSD operates perfectly in white light. LSDs therefore exhibit a high degree of versatility because they may be employed with light from almost any source, including LEDs, daylight, a tungsten halogen lamp, or an arc lamp.

Two types of LSDs are currently available, namely a "volume LSD" and a "surface LSD." A volume LSD is a volumetric optical element primarily characterized by the incorporation of light shaping structures within its body and which diffract light passing therethrough. A surface LSD is a surface relief optical element primarily characterized by the incorporation of light shaping structures on its surface and which diffract light passing therethrough. A surface LSD in addition to being produced optically may also be created by mechanical manipulation of the surface of the medium. See below for a list of some pending applications and issued patents related to each. Volume LSDs and surface LSDs are interchangeable in most applications. There are some limited applications, however, in which volume LSDs are preferred, such as applications in which the LSD is submerged in a liquid.

The light shaping structures in volume LSDs are recorded using a coherent light recording system similar to a holographic recording system. Coherent light passed through a master diffuser is incident upon a volumetric photosensitive medium (such as dichromated gelatin DCG or another volume recording material). The speckle pattern in the light incident the medium is rendered in the medium by altering the refractive index of the medium. Where the speckle pattern is bright, the medium is hardened and the refractive index of the medium is increased. Where the speckle pattern is dark, the refractive index remains substantially unchanged. Upon development, these variations in the refractive index are rendered essentially permanent. Alternatively, the speckle pattern may be generated using an incoherent light source and a speckle-imitating mask in a process akin to a printing process. Light passed through the mask is incident upon the volumetric medium and the speckle pattern generates variations in the refractive index of the material essentially as before.

Surface LSDs are produced in similar fashion as well as in alternative ways. Recording set ups similar to those described above are used with the exception that a nonvolume recording medium such as standard photoresist is used in place of a volume medium such as DCG. During development, the areas having increased refractive index due to hardening remain while the softer, lower index areas are washed away. This process leaves microstructures having light shaping properties at the surface of the medium. These structures are then replicated in any number of materials including plastics using various replication techniques such as embossing, injection molding, and epoxy replication.

LSD production is disclosed in U.S. Pat. No. 5,365,354 to Jannson et al. (the '354 patent), U.S. Pat. No. 5,609,939 to Petersen et al. (the '939 patent), and U.S. Pat. No. 5,534,386 to Petersen et al. (the '386 patent). The '354 patent, the '386 patent, and the '939 patent hereby are incorporated by reference for their disclosure of the production of a LSD. Commonly assigned U.S. patent application Ser. No. 08/902,415, to Lieberman entitled "Monolithic Glass Light Shaping Diffuser and Method for its Production" (the '415 application) discloses several methods for fabricating diffusers from a sol-gel glass composition from a plastic or epoxy submaster for high temperature uses. The '415 application is also incorporated herein by reference for its disclosure of LSD production. Other related U.S. patent applications include "Non-Lambertian Glass Diffuser and Method of Making," filed Aug. 20, 1998, "Diffuser Master and Method of Manufacture," filed Aug. 20, 1998, "High Efficiency Monolithic Glass Light Shaping Diffuser and Method of Making," filed Aug. 25, 1998, "Optical Element Having an Integral Surface Diffuser," filed Aug. 25, 1998, "Vehicle Light Assembly Including a Diffuser Surface Structure," filed Aug. 25, 1998, "Apparatus Having a Light Source and a Sol-Gel Monolithic Diffuser," filed Aug. 25, 1998, "Passive Matrix Liquid Crystal Display," filed Aug. 25, 1998, and "Device Including an Optical Element With a Diffuser," filed Aug. 25, 1998. These applications are also incorporated by reference herein.

LSDs heretofore were formed solely from plastics such as acrylic or polycarbonate plastics because only these materials were sufficiently deformable (under conditions suitable for interaction with a submaster) to accept the light shaping structures. Limitations resulting from the physical properties of these plastics restrict the applicable range of LSD operation.

For instance, the plastics from which LSDs are formed typically have a glass transition temperature of below about 150° C. and often below about 100° C. Conventional plastic LSDs therefore cannot be used in applications in which the LSD may be subjected to sufficient heat to raise the temperature of the LSD to above this glass transition temperature. This heat may be received directly from a light source such as an arc lamp or may be absorbed in the form of UV or infrared radiation. Plastic LSDs therefore generally cannot be used in heat lamps, liquid crystal display projectors, projector lamps, track lighting, or other light sources that generate significant heat near the location of the LSD. Plastic LSDs also are not widely usable with light sources operating in the ultraviolet range or infrared range which emit radiation that is absorbed by the plastic.

One limitation of plastic LSDs is that they cannot be subject to a hot coating operation. It is often desirable to coat a diffuser with a layer of an anti-reflective (AR) coating in order to raise the efficiency of the diffuser. Many coatings, including many AR coatings, can be applied only at temperatures above the glass transition temperature of plastics commonly used in LSDs. Conventional LSDs are not usable with these coatings.

Yet another problem associated with a conventional plastic LSD is that it is difficult or impossible to form a high quality three-dimensional lens on its exit surface. It is desirable in a variety of diffuser applications to place a lens on the exit surface of the diffuser. Conventional plastic LSDs cannot be ground, polished, or molded into high quality lenses. High quality lenses can be produced on the exit surface of a LSD only by laminating or otherwise attaching a Fresnel lens on it. As is well known in the art, a Fresnel lens is one having a planar or two-dimensional surface that in use creates an effect that is designed to approximate the effect of a three-dimensional curved lens. Mounting a separate Fresnel lens onto the exit surface of a diffuser is substantially more difficult and expensive than simply grinding or otherwise forming a conventional curved lens on the exit surface and may produce a lower quality lens.

Many of the above-identified disadvantages of a plastic LSD could be avoided if the LSD were to be formed from glass rather than a plastic. However, light shaping structures cannot be embossed on or otherwise recorded in a conventional glass structure during its production process because the high temperatures accompanying formation of conventional glass (on the order of 1,800° C.) would destroy the master or submaster bearing the light shaping structures.

The '415 application noted above discloses a monolithic glass light shaping diffuser construction and a method of making the diffuser from a glass composition known as sol-gel. The '415 application discloses a volume LSD and a method of making the volume diffuser. It also discloses a surface LSD and methods of making the surface diffuser. The surface LSD is formed by a casting process wherein the sol-gel composition is cast in a plastic mold which bears the light shaping structures on an inner surface of the mold. Another method for forming a surface LSD is disclosed in the '415 application whereby a coating or layer of the sol-gel composition forms a film layer on a substrate. A submaster or master diffuser which bears the light shaping relief structures contacts the film layer so that the surface structures are recorded in the film layer after the sol-gel layer undergoes a glass transition, an aging and a heat treating process. The master or submaster which bears the surface relief structures is disclosed as being made from a plastic material.

Depending upon the process utilized to form the sol-gel glass LSD disclosed in the '415 application, the master or submaster from which the surface relief structures are recorded is formed from a substantially rigid and hard plastic material which is very stiff and inflexible. In order for the surface relief structures to be completely and properly recorded into the sol-gel material, the sol-gel material must be sustained in a containing space, coated onto a base substrate or inserted into a mold at a precisely controlled viscosity. If the viscosity varies even slightly less or slightly greater than desired, the sol-gel material may not flow properly and completely contact the surface relief structure of the master. Additionally, the sol-gel material may not flow completely into all of the surface relief spaces if at a slightly undesirable viscosity. The hard plastic material of the master or submaster does not yield, bend or flex at all to aid in having the sol-gel material flow properly. Hence, if the viscosity is not precisely as desired, all of the surface relief structures may not be recorded into the sol-gel material or may be recorded inaccurately.

An additional problem with these present processes is that each time a submaster copy of a particular original master surface relief structure is recorded it loses some of its resolution and therefore provides slightly altered light shaping characteristics. For example, a master photoresist material is typically provided having the surface relief structures recorded therein from which a second generation submaster is created having the features subsequently recorded therein. A third generation submaster is then created from the second submaster having the features subsequently recorded therein as well. Sometimes, other additional submasters are created between the original master and the final diffuser product. Each subsequent formation of the surface relief structures in a subsequently produced submaster creates lower resolution and hence lower quality light shaping characteristics, and thus it would be beneficial to be able to eliminate one of these submaster steps.

OBJECTS AND SUMMARY OF THE INVENTION

A principle object of the present invention is to provide a monolithic glass surface LSD that has a wider operating range in terms of temperature and/or wavelength than currently available plastic LSDs.

Another object of the invention is to provide a surface LSD capable of having a high quality curved lens formed on its exit surface.

Still another object of the invention is to provide a method of making a surface glass LSD from a monolithic glass material which, when formed, meets some or all of the foregoing objects.

An additional object of the invention is to provide a high efficiency glass surface LSD that has a high resolution of the surface relief structures originally formed in the original or first master diffuser, therefore providing more accurately recorded light shaping characteristics.

Another object of the invention is to provide a method of making such a high efficiency surface LSD which reduces the number of subsequent recordings from the original master surface to the surface of the LSD.

A still further object of the invention is to provide a method of making a surface glass LSD which is more tolerant of varying viscosity in the glass material during fabrication of the LSD.

These objects are achieved in a remarkably simple and effective manner by forming a LSD in a glass material which assumes a state during one or more phases of its formation process in which the desired light shaping structures can be embossed on or otherwise recorded into the surface of the glass material under conditions hospitable to the master or submaster. Preferably, the light shaping structures are produced during formation of a so-called "sol-gel" glass either by a casting or molding technique or by an embossing or pressing technique thereby forming a surface LSD.

Surface LSDs can be produced from castable sol-gel glasses simply by casting the solution in a relatively flexible mold formed of a rubber material wherein the mold bears the light shaping structures on an inner surface. The light shaping structures are embossed on the sol-gel material during the molding process.

Surface LSDs can also be produced from coatable sol-gel glasses by coating a layer of the sol-gel solution onto a base substrate to produce a film layer on the substrate, causing the film layer to undergo a sol-to-gel transition, recording light shaping structures in at least a portion of the film layer by contacting the film layer with a rubber submaster, and aging the gel to form a porous glass. The final step in the preferred process is to heat treat the glass to its sintering temperature to produce a non-porous glass. The process may be enhanced by pressing the rubber master bearing the light shaping structures into contact with the film layer.

These and other objects, features and advantages of the invention will become apparent to those skilled in the art from the following detailed description and the accompanying drawings. It should be understood, however, that the detailed description and the specific examples, while indicating preferred embodiments of the present invention, are given by way of illustration and not of limitation. Many changes and modifications may be made within the scope of the present invention and without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Introduction

Figure 1:
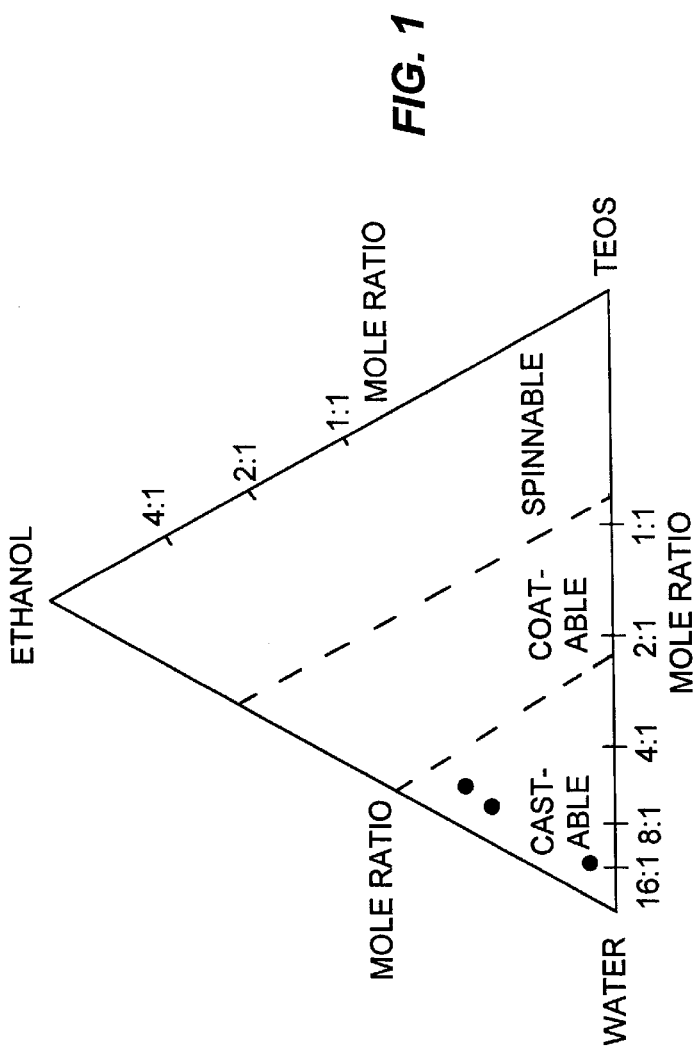
FIG. 1 is a ternary phase diagram for the TEOS-Water-ethanol sol-gel solution with compositions plotted in mole percent.

Pursuant to the invention, a method is provided of forming a surface light shaping diffuser (LSD) from a monolithic glass material by recording light shaping structures in the glass material during its formation. A surface LSD can be produced by adding the sol-gel material to a relatively flexible mold having the surface relief shaping structure on an interior mold surface, or by embossing the surface relief light shaping structures onto a high quality optical glass from a rubber substrate, or by embossing the light shaping structures from a rubber substrate onto a glass film layer coated onto a base substrate. Such LSD's control the angular spread of transmitted light and homogenize otherwise spatially noisy light sources such as liquid crystal displays and filamented light sources, both while maintaining damage thresholds consistent with any glass optical element. The LSD has a transmission efficiency of over 90% from the Ultraviolet wavelengths through the visible spectrum and into the near-infrared. Moreover, because the LSD is a true glass, it is capable of withstanding temperatures well beyond glass transition temperatures of plastic LSDs, can be formed in a convex or concave surface through conventional molding, grinding, or polishing techniques, and can be coated by hot-coating techniques. The LSD also has a very high laser power threshold.

2. Process Overview

At the heart of the invention is the discovery that a LSD can be produced by recording light shaping structures (sometimes known collectively as "speckle," particularly when the structures extend into the interior of the diffuser) in a monolithic glass material during material formation if the glass material is one which is formed under conditions hospitable to the master or submaster bearing the light shaping structures. The currently-preferred technique for carrying out the present invention involves recording the light shaping structures in the material during a so-called "sol-gel" process. As is known to those skilled in the art of making sol-gel glass, the sol-gel process is a low-temperature approach to the production of oxide glasses. An oxide network is obtained via hydrolization and inorganic polymerization reactions starting with molecular precursors. The sol-gel process offers several advantages when compared to the production of glasses by conventional melting techniques including (1) the formation of a higher optical quality metal oxide glass, (2) the ready obtainment of homogeneous multi-component glasses by mixing molecular precursor solutions, (3) the obtainment of higher purity and lower processing temperatures, and (4) the ability to form fibers, films, monoliths, or compositions by techniques such as fiber drawing, spinning, dipping, casting and impregnation due to the rheological properties of the sols or gels. Properties of sol-gel glasses rendering them well-suited for use as LSDs are summarized in Table 1:

TABLE 1

| Material Properties of Sol-Gel Derived Silica Glasses | |
|---|---|
| Young Modulus | 73 GPa |
| Hardness | 6.2 GPa |
| Strength | 5.5 GPa |
| Thermal Expansion Coefficient | $5.5 \times 10^{-7} \, °C.^{-1}$ |
| Thermal Conductivity | $3.3 \times 10^{-3} \, cal \, sec^{-1} \, °C.^{-1}$ |

TABLE 1-continued

Material Properties of Sol-Gel Derived Silica Glasses

| | |
|---|---|
| Laser Damage Threshold | 1–5 Joules cm$^{-2}$ |
| Chemical Resistance | High (moisture acid and base) |

The typical sol-gel process includes first preparing a solution of a metal alkyl oxide, water, and a suitable solvent such as ethanol, then causing or permitting the solution to undergo a sol-to-gel transition to form a gel, and then aging the gel to form a porous hydrated glass. The hydrated glass is then heat treated to reduce its porosity by consolidation. A common example of the process uses a mixture of tetraethylorthosilicate (TEOS), water, and ethanol to produce fused silica glass. Other examples include the use of aluminumtert-buitoxide [Al(OBu)$_3$] for alumina gels and tetraorthoethyltitanate (TET) for titania gels. Depending on the optical properties of the glass material desired, multi-component reagents are often mixed into the solution to produce glasses with special characteristics such as high indices of refraction, high strength, high temperature, non-linear properties, and conduction properties.

The chemistry of the sol-gel process is based on the hydroxylation and condensation reactions of organometallic molecular precursors. Metal alkoxides are the most versatile precursors for the sol-gel synthesis of oxides because they are very reactive towards nucleophilic reagents such as water. Hydrolysis occurs when a metal alkoxide and water are mixed in a mutual solvent, usually an alcohol. Sol-gel matrices for silica LSDs can be divided into spinnable, coatable, and castable solutions. Empirical miscibility formulations for TEOS-water-ethanol solutions at room temperature are plotted on the triangular phase diagram of FIG. 1 in mole percent. As can be seen from this Figure, sol-gel solutions are spinnable with less than 40 mole percent water, are coatable with between 40 and 70 mole percent water, and are castable with more than 70 mole percent water.

Figure 2:
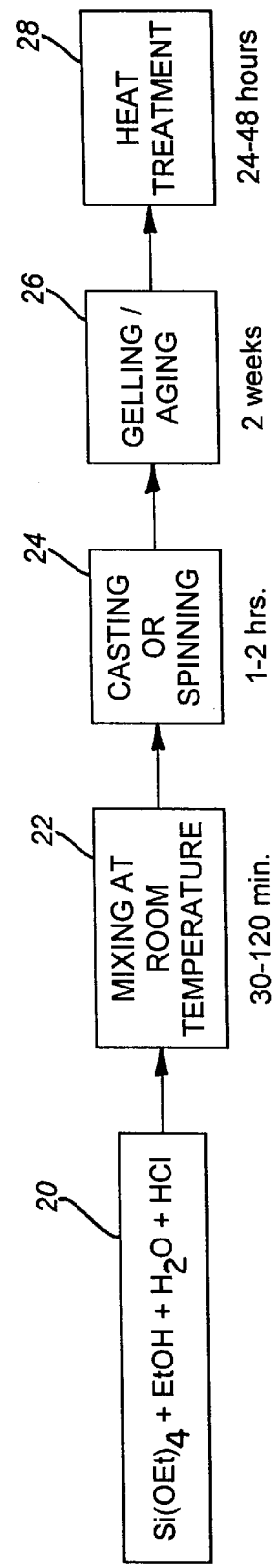
FIG. 2 is a flow chart schematically representing a process for preparing a sol-gel monolithic glass from a TEOS precursor solution.

A typical sol-gel process will now be described to facilitate an understanding of how light shaping structures (speckle) can be recorded in a monolithic glass structure at low temperatures hospitable to the master or submaster. Referring now to FIG. 2, a process for producing a high optical quality monolithic silica glass by casting begins by preparing a solution of TEOS in ethanol and then partially hydrolyzing the solution with water as seen in Step 20. The solution subject to mixing typically will contain about 45% by volume TEOS, 45% by volume ethanol, and 10% by volume water which if desired may include approximately 1% by volume of a suitable acid such as HCl to lower the pH of the finished glass product so as to increase its durability. The ratios of TEOS, ethanol, and water can be varied so long as the relative ratios of all three of these components are retained in the portion of the triangular construction of FIG. 2 that results in a castable solution.

The solution is then mixed in Step 22 to increase its viscosity by the hydrolyzation of TEOS and the evaporation of ethanol. This mixing preferably takes place at room temperature and usually continues for 30–120 minutes with a 60 minute or one hour mixing period being the preferred minimum period to obtain a preferred viscosity of approximately 100 Cts. The process can be accelerated by mixing at higher temperatures (up to about 70° C.) to increase the rate of ethanol evaporation or can be decelerated by mixing at lower temperatures (down to about 0° C.) to decrease the rate of ethanol evaporation.

Next, the viscous solution formed by the mixing step is cast in a suitable casting mold in Step 24. The cast solution then undergoes a gelling/aging process in Step 26 characterized by transition of the viscous solution to a gelatinous phase followed by transition of the gel to a porous glass phase. For monoliths, this process typically takes about 2 to 4 weeks (and sometimes longer) depending upon the initial viscosity of the solution, the volume of solution in the casting mold, and the environmental conditions under which the process occurs. High quality glass can be obtained most assuredly by aging under conditions of controlled temperature and humidity. The aging process terminates with a baking operation in which the glass is heated in the mold at a relatively low temperature (preferably on the order of about 70° C. to 120° C.) for a sufficient period of time to harden the glass sufficiently to permit its removal from the mold and subsequent handling. The length of the baking period varies from application to application, ranging from as little as a few hours to as long as two days.

A true monolithic glass material is formed during the aging process. However, this glass is very porous and relatively brittle. The glass preferably is heat treated in Step 28 to consolidate the glass (i.e., to collapse the pores into a solid glass structure) by sintering and thereby to increase its rigidity and durability. The typical heat treatment process lasts about 24–48 hours in a cycle in which the temperature ramps upward from about 25° C. to about 1000° C. to about 1050° C. at a rate of 0.1° C. per minute (with the temperature being held at plateaus for periods of about 2 hours at increments of about 100° C.), and then ramps back down again.

Figure 3:
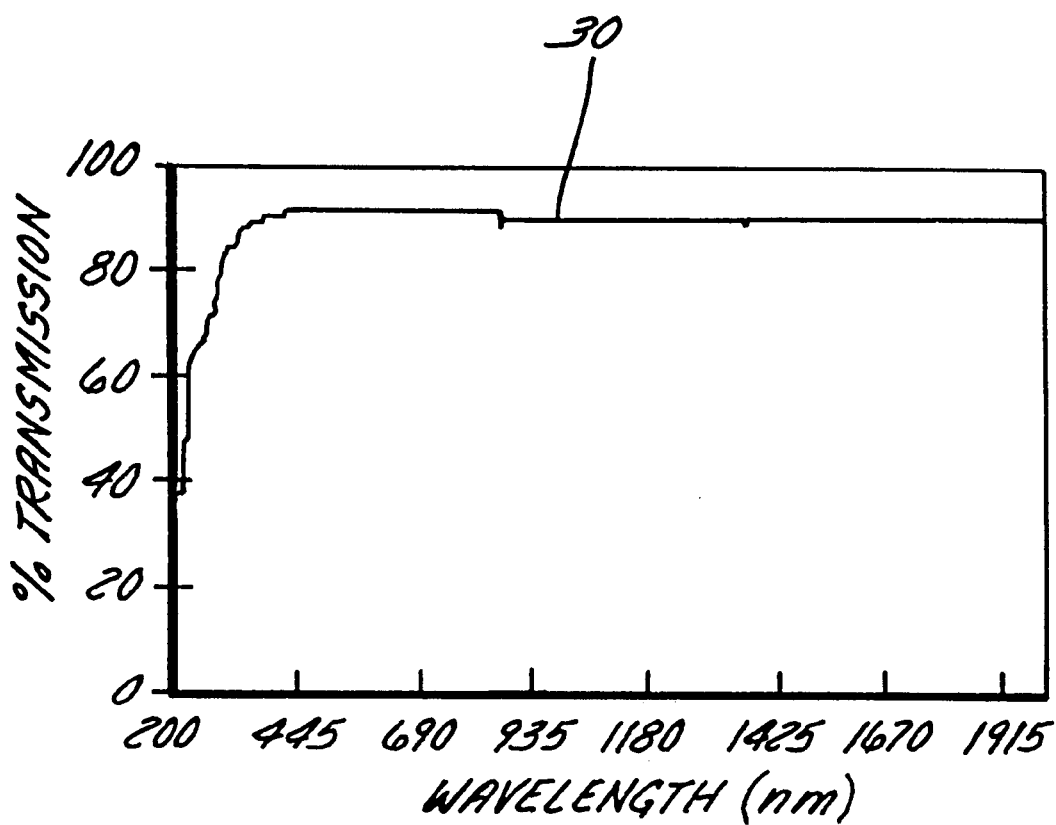
FIG. 3 is a graph plotting wavelength versus transmission percentage for a sol-gel monolithic glass with which the present invention is applicable.

The result of the process of FIG. 2 is a high quality silica glass monolith with high durability and other beneficial qualities discussed above in conjunction with Table 1. The resulting glass also has excellent transmissibility. In fact, as represented by the curve 30 in FIG. 3, the transmissibility of the monolithic glass exceeds 90% for wavelengths above about 350 nm and exceeds 95% or higher for wavelengths above about 450 nm (ignoring 8% Fresnel reflection).

It should be noted at this point that the casting process described above could be replaced with coating or spinning processes so long as the proper ratio of TEOS/ethanol/water is chosen. The gel-to-glass transition time for films typically is much shorter than for monoliths, typically lasting a few hours.

Light shaping structures can be recorded in the surface of a sol-gel glass material during an intermediate phase of its formation process to produce a surface LSD in the completed glass structure. Several preferred techniques for forming surface LSDs from monolithic sol-gel glass materials now will be detailed. While these techniques are described in conjunction with a TEOS:ethanol:H$_2$O system, the described processes are equally applicable to any suitable metal alkoxide:alcohol:H$_2$O system.

3. Forming a Rubber Submaster Surface Relief Structure

Figure 4:
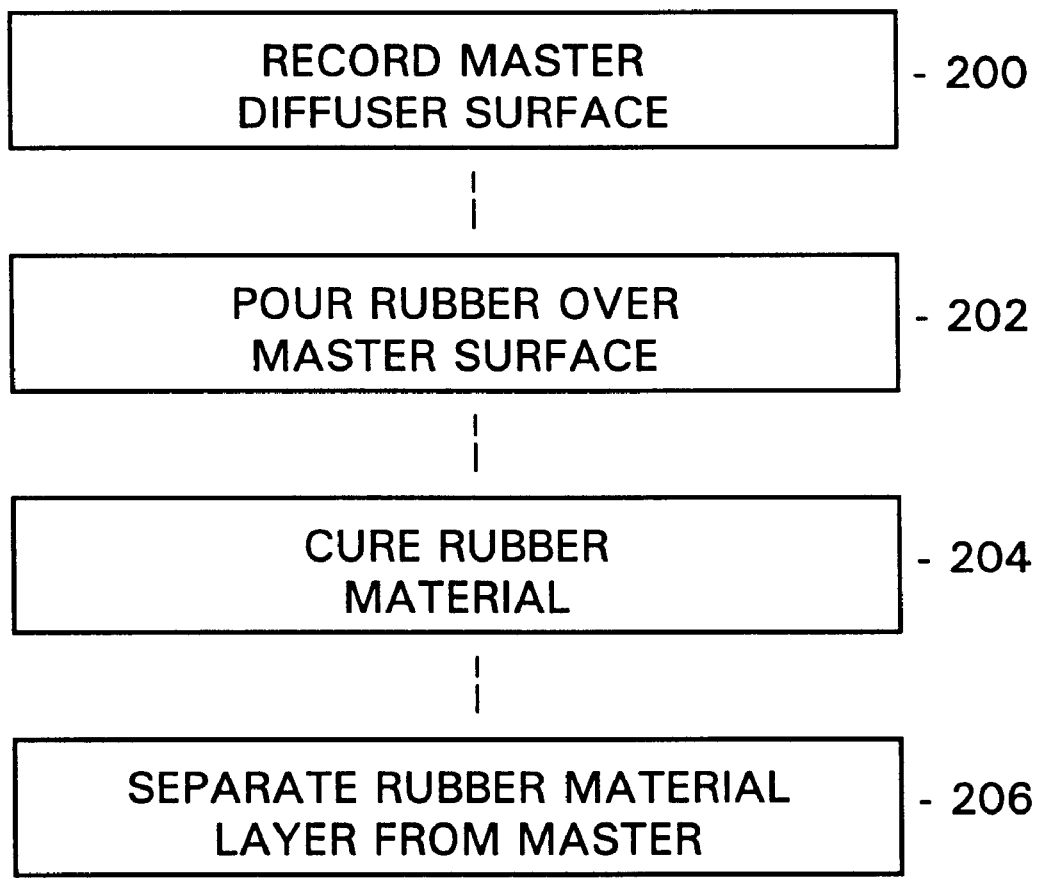
FIG. 4 is a flow chart schematically representing a process for forming a rubber submaster incorporating an optical surface relief structure recorded from a master.

A submaster surface diffuser can be produced from a soft, flexible material such as rubber. For example, a silicone rubber material can be utilized wherein a plurality of light shaping structures are replicated from a prior generation diffuser such as the original master diffuser into the rubber material as the material is cured. FIG. 4 illustrates a simple schematic representation of a process for forming such a rubber submaster diffuser. A process of forming a rubber submaster diffuser is also disclosed and described in commonly assigned and co-pending U.S. patent application Ser. No. 09/052,586 to Savant et al. and entitled "Method of Making Replicas While Preserving Master." The subject matter of this co-pending application is incorporated herein by reference for its disclosure of the production of a rubber submaster.

Referring to FIG. 4, a master diffuser surface is created by recording 200 optical features on a photosensitive medium using coherent or incoherent light or by etching, sandblasting or buffing a metallic surface to form depressions or irregularities thereon as disclosed in co-pending application entitled "Diffuser Master and Method of Manufacture" filed Aug. 20, 1998 incorporated by reference herein. The photosensitive material or the metal substrate defines an original master diffuser surface having the particularly desired optical characteristics recorded thereon. A layer of rubber such as RTV silicone is poured 202 over a surface of the master so that the optical surface features of the master are in contact with the rubber material. The rubber material is then cured 204 to record the surface structures in the rubber material. The rubber is then separated 206 from the master while retaining therein the optical features in the surface of the rubber material.

Such a rubber submaster may be used to then successively create plastic subgenerations of submasters and/or final optical products by covering the submaster with a layer of material such as epoxy, covering the layer of epoxy with a plastic substrate, curing the epoxy and separating the epoxy from the submaster in order to produce a plastic element having the optical features recorded therein. As previously described, such a plastic substrate is then used as a submaster in recording optical features in further subgenerations of diffusers.

Also as described above, each subgeneration created from the master optical element provides a relief structure or diffuser surface which is somewhat lower in resolution and degenerated from the original master. The present invention is directed toward eliminating at least one of the steps or subgenerations and providing a glass diffuser or LSD produced directly from the rubber submaster.

Many different types of rubber or rubber compounds may be utilized in following the methods according to the present invention. However, it is imperative that the rubber material be relatively flexible when compared to plastics and plastic composites in order to provide the desirable characteristics of the invention. For example, the RTV silicone material described above and other silicone compositions have been utilized successfully in practicing the present invention. Other rubber materials however may be suitable and used as a substitute for the RTV silicone material.

4. Fabrication of LSDs From Coatable or Spinnable Sol-Gel Glasses

It is possible and often desirable to produce surface LSDs from coatable or spinnable sol-gel glasses. When compared to castable sol-gel glasses, coatable sol-gel glasses are generally considered to be better-suited for mass production because the gelling/aging period is much shorter than the gelling/aging period of castable sol-gel glasses (on the order of a few hours as opposed to two weeks or more for a castable glass).

Figure 5:
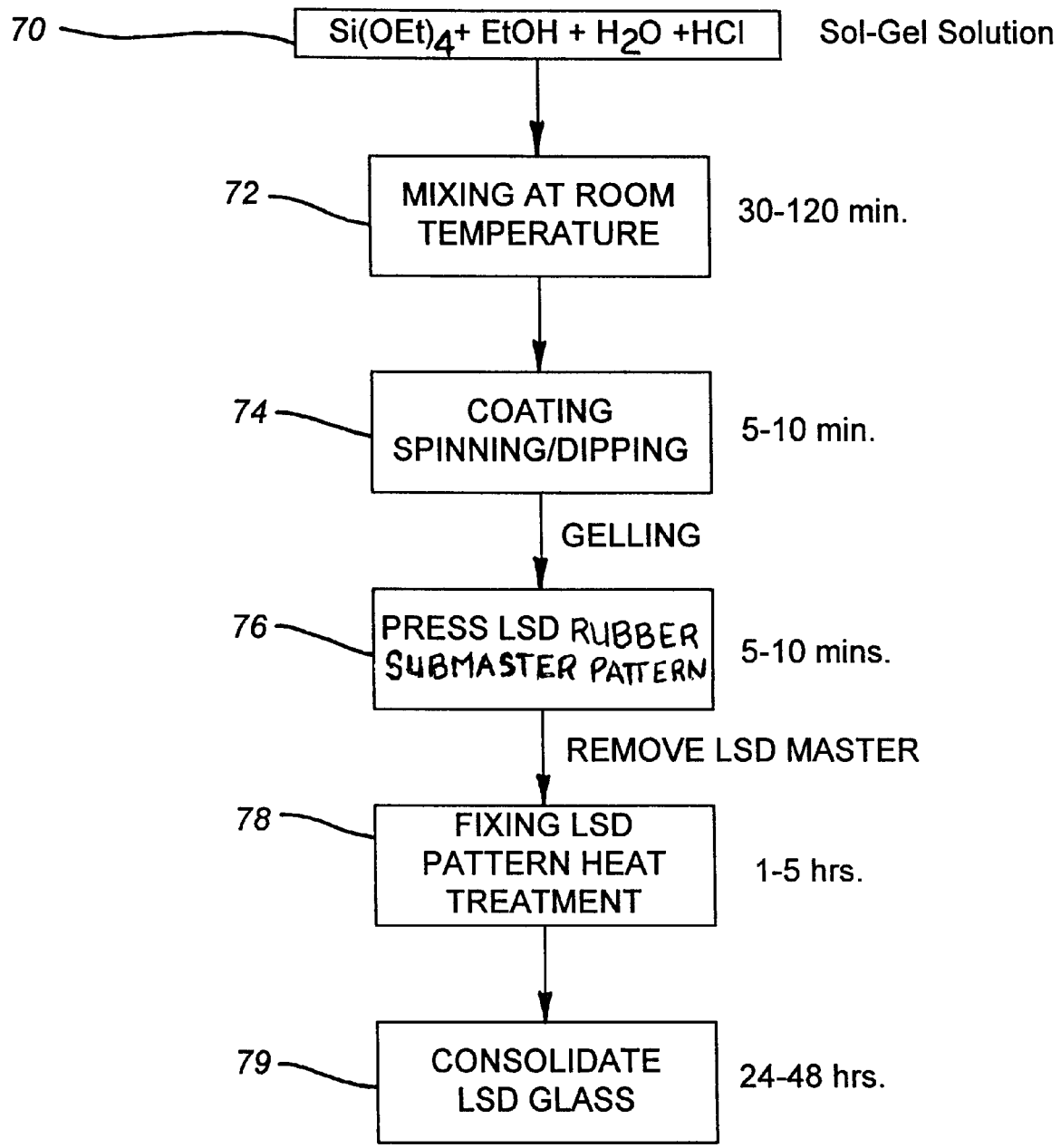
FIG. 5 is a flow chart schematically representing a first process for forming a monolithic glass LSD by coating.

Referring to FIG. 5, an exemplary coating process proceeds from solution preparation in Step 70 (which is identical to the preparation Step 20 described above) to mixing in Step 72. Less mixing is required than discussed in Section 2 and in Section 5 in conjunction with the casting processes because a lower viscosity (on the order of about 10–20 Cts) is required for coating. The somewhat-viscous solution is then coated onto a conventional glass substrate in Step 74 by a known spinning, dipping, or spin-coating technique thereby to deposit a thin film layer having a thickness of about 10 microns to 100 microns on the surface of the base substrate.

Then a rubber LSD submaster fabricated as described above and bearing the light shaping structures is pressed or formed against the surface in Step 76 to emboss a direct replica of the light shaping structures on the film layer. Preferably, the rubber submaster is actively pressed or forced against the surface of the film layer to completely replicate the light shaping structures. The light shaping structures are then fixed in place in Step 78 by heating the film layer to about 50° C. for 1–5 hours so that the glass of the film layer transitions from a gelatinous phase to a porous glass phase (this is analogous to the aging step in the casting process). The rubber LSD submaster is then removed from the glass, and the glass is heat treated in the normal manner in Step 79 to consolidate the glass in the film layer. A variation to this approach can be to consolidate the pressing and heating Steps 74 and 76 by using a heated press to emboss or apply the LSD structures to the film layer.

Figure 8:
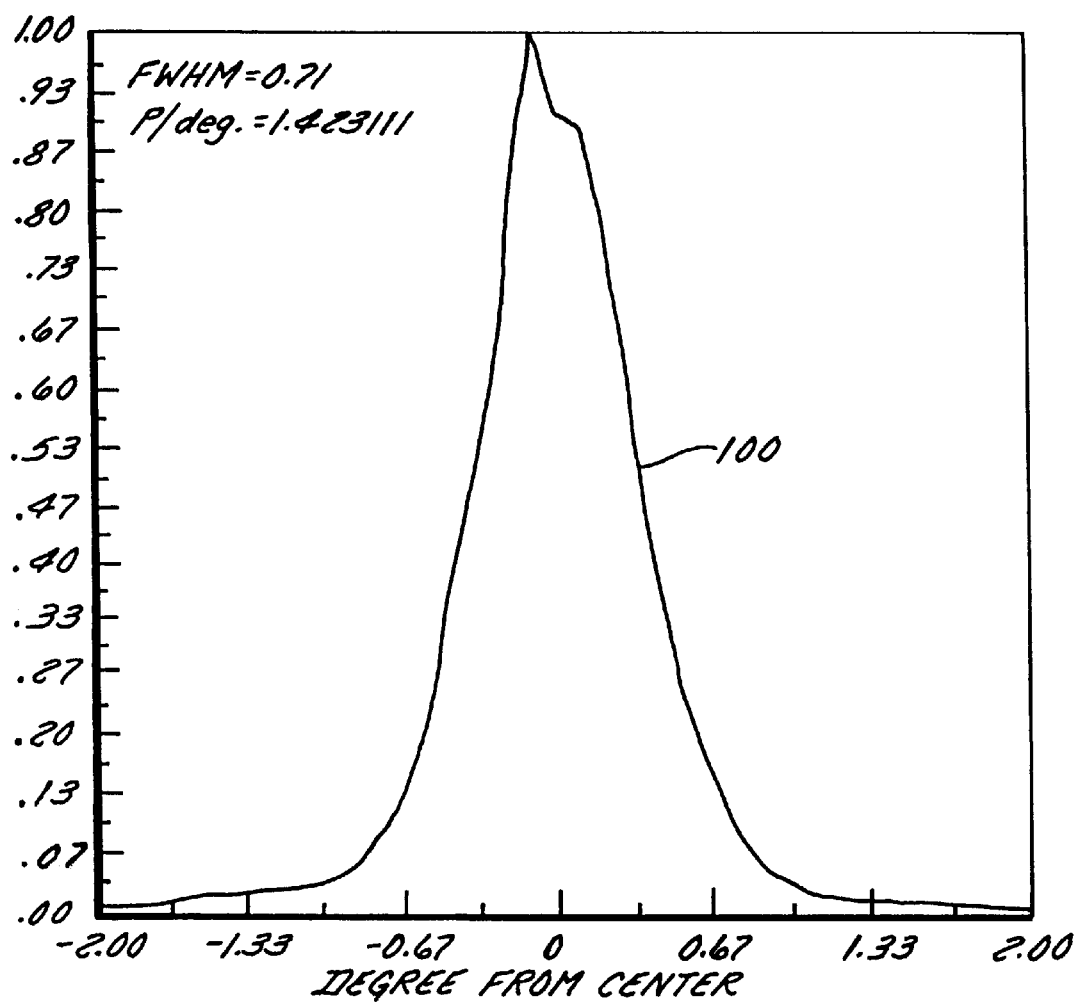
FIG. 8 is a graph plotting angular light spatial distribution of a narrow angle sol-gel monolithic glass LSD in which the glass is a porous glass.
Figure 9:
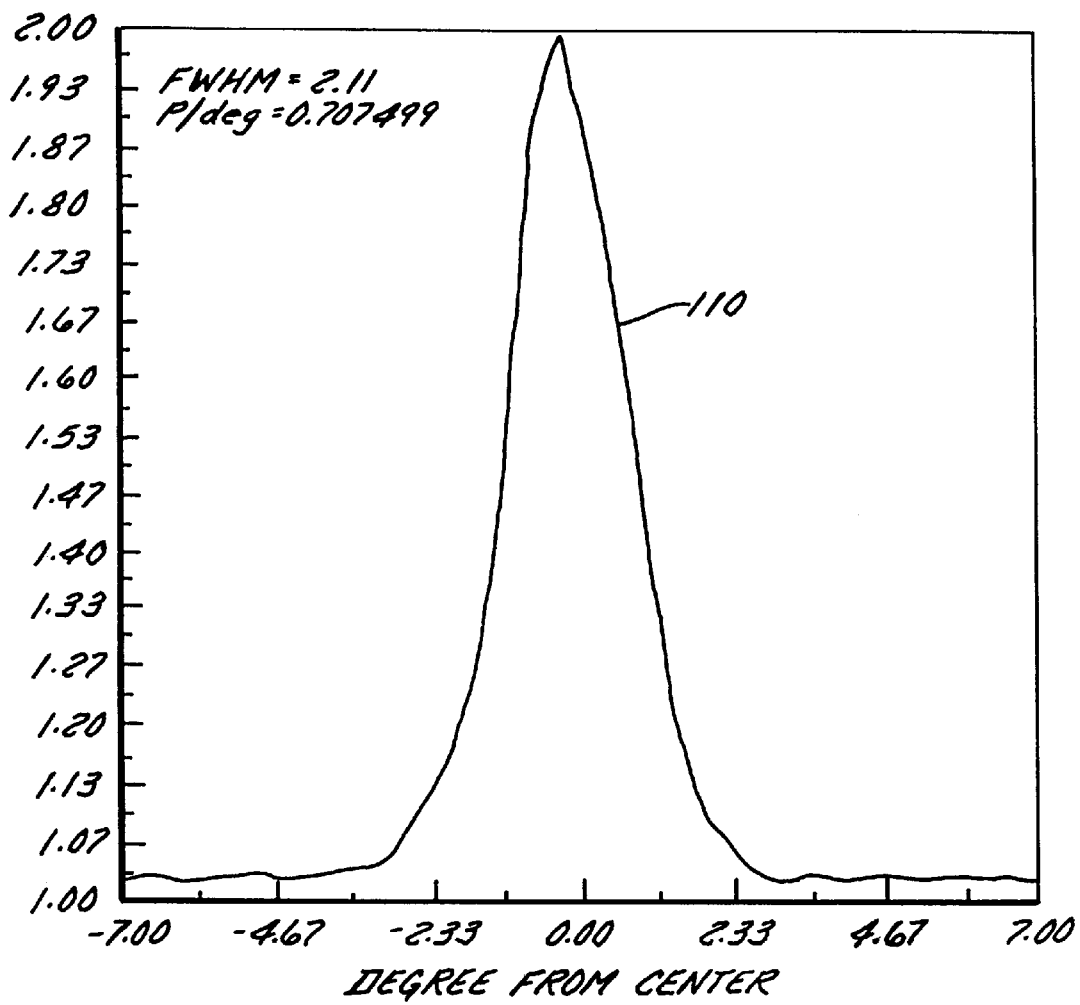
FIG. 9 is a graph plotting angular light spatial distribution of a narrow angle sol-gel monolithic glass LSD in which the glass is a sintered glass.

Significant shrinkage on the order of 30–40% may occur during heat treatment of the porous glass. The effect of this shrinkage on angular spatial distribution may be appreciated from comparing the curve 100 in FIG. 8 to the curve 110 in FIG. 9. Curve 100 indicates that a narrow angle, for example 0.71°, is obtained after post-processing to a temperature of about 700° C. (a temperature which is still well below the consolidation temperature). Curve 110 illustrates that this angular light distribution increases to, for example, 2.11°, after the consolidation process during heat treating, or after the pour structure is sintered at a temperature of about 1,000° C. to about 1,050° C. This represents an overall increase in the angular distribution characteristics of approximately 66% from before the heat treating process to after the heat treating process.

It has been discovered that shrinkage due to heat treating improves the optical qualities of a LSD. All components of the LSD, including the light shaping structures or speckle, shrink a corresponding amount. Speckle shrinkage results in enhanced imaging. For instance, if a line formed during the creating of the original master diffuser surface is 100 microns wide, the corresponding line produced by the final LSD product will be 70 microns wide. It should be noted that shrinkage due to heat treatment and the resultant image enhancement also occurs in the production of volume LSDs although the present methods of this invention are not related to volume LSDs made from a glass monolithic material.

Monolithic glass surface LSDs produced by the techniques described above are highly versatile, high quality LSDs that can be used in high temperature applications in which conventional plastic LSDs would fail. Glass LSDs, unlike plastic LSDs, therefore can be used as homogenizers in lasers and particularly high power lasers, UV lasers, infrared lasers, and near-infrared lasers. They also can be used in optical applications where substantial heat is generated such as projectors and headlamps for automobiles. They may also replace a rod integrator used in movie projectors or the like and, indeed, are dramatically more efficient than conventional rod integrators (on the order of 90–96% efficient as opposed to on the order of 20% efficient). In addition, because they are formed from optical quality glass, their exit surfaces can be ground, polished, or otherwise formed into a high-quality curved lens—an option that is not available with plastic LSDs, or into any optical element such as a prism or a beam shaper.

Whether light shaping structures are embossed, pressed or merely formed by pouring a sol-gel material into contact with the rubber submaster, these processes provide several advantages over the previously known method of forming a surface LSD from a monolithic glass material utilizing a plastic submaster. For instance, the viscosity of the sol-gel material need not be controlled as precisely when utilizing a rubber submaster than when compared to utilizing a plastic submaster. This is because the plastic material is essentially rigid and inflexible when compared to the relatively flexible rubber material. As the sol-gel material is pressed, embossed or poured, it may flow differently at various points over the surface of the submaster due to viscosity variations. Whether embossed or pressed, the light shaping structures of the submaster will not form quite as accurately or completely if the sol-gel material does not completely flow into the surface irregularities of the light shaping structures on the submaster or may flow away from the surface of the submaster if the viscosity is to low. Additionally, during the aging process and the heat treating process, the sol-gel material characteristics can change which tends to cause the surface of the sol-gel material to pull away from the surface of the submaster. When plastic is used as the submaster, a separation between the sol-gel material and the plastic occurs which can prevent complete replication of the light shaping structures into the sol-gel material. If a rubber submaster is used, the flexibility of the rubber permits the light shaping structures and surface of the submaster to remain in contact with the sol-gel material because if the sol-gel material moves slightly relative to an initial position, the rubber material can move along with the sol-gel. Thus, the light shaping structures replicated into the sol-gel material more accurately represent those of the rubber submaster.

Another benefit of utilizing a rubber submaster is that rubber provides a greater depth and better feature replication from the original master diffuser surface because of the flexibility of the rubber. Thus, the second generation rubber submaster will more accurately portray the light shaping structures of the original master diffuser surface.

One additional advantage of utilizing a rubber submaster is that it eliminates one subgeneration step between production of the original master diffuser surface and the surface LSD final product. As described above, when utilizing a plastic submaster, an intermediate step of producing a metal shim submaster and/or an epoxy subgeneration layer is necessary thus requiring at least two subgenerations or submasters between production of the original diffuser surface and the glass monolithic LSD surface. Each subgeneration of submaster produces a slightly degenerated and lower resolution copy of the light shaping structures of the original. By eliminating one subgeneration step, a more accurate and thus higher resolution surface structure is produced in the glass LSD.

5. Casting of Surface Relief LSD's Onto Sol-Gel Glasses

Figure 6:
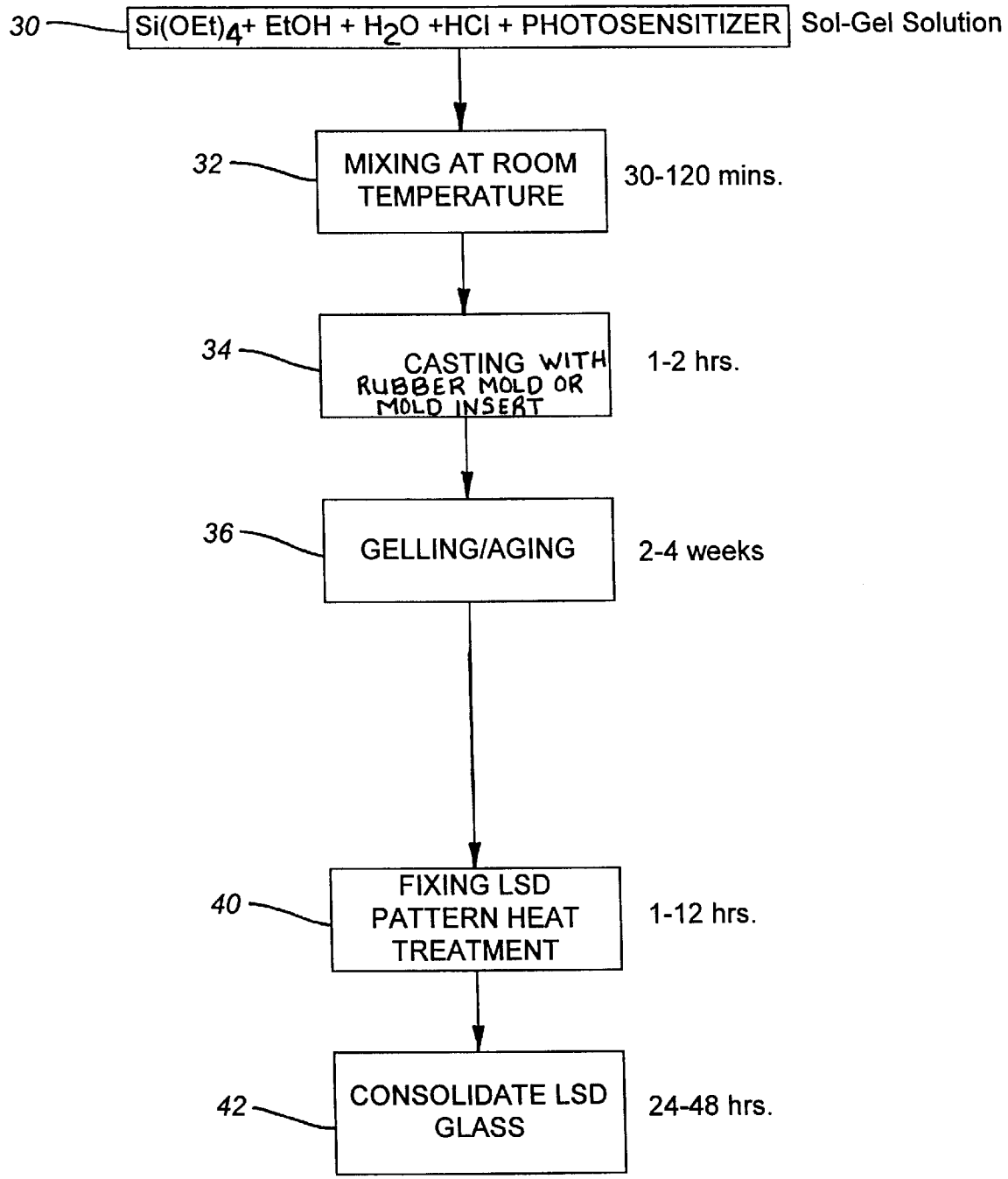
FIG. 6 is a flow chart schematically representing a first process for forming a monolithic glass LSD by casting or molding.

A surface relief LSD element or surface LSD can be produced by direct casting using the process described above in conjunction with FIG. 2 and also FIG. 6. A rubber submaster surface structure fabricated as shown in FIG. 4 and bearing light shaping structures is placed directly on the inside surface of the casting mold in Step 34, preferably by using a rubber submaster LSD as one or more of the inner surfaces of the casting mold. Alternatively, the mold itself in Step 34 may be formed of a suitable rubber material having the surface structure formed on an inside surface. When a viscous solution is cast into the mold and aged during the Steps 24 and 26 discussed above in conjunction with FIG. 2, an exact replica of the light shaping structures on the surface of the rubber LSD submaster is transferred directly to the surface of the gel in the mold. The resulting embossed light shaping structures are retained in the glass monolith structure. FIG. 6 illustrates the steps of making the solution 30, mixing the solution 32, casting the solution into the appropriate mold 34, aging 36, heat treating 40 and consolidating 42.

Figure 7:
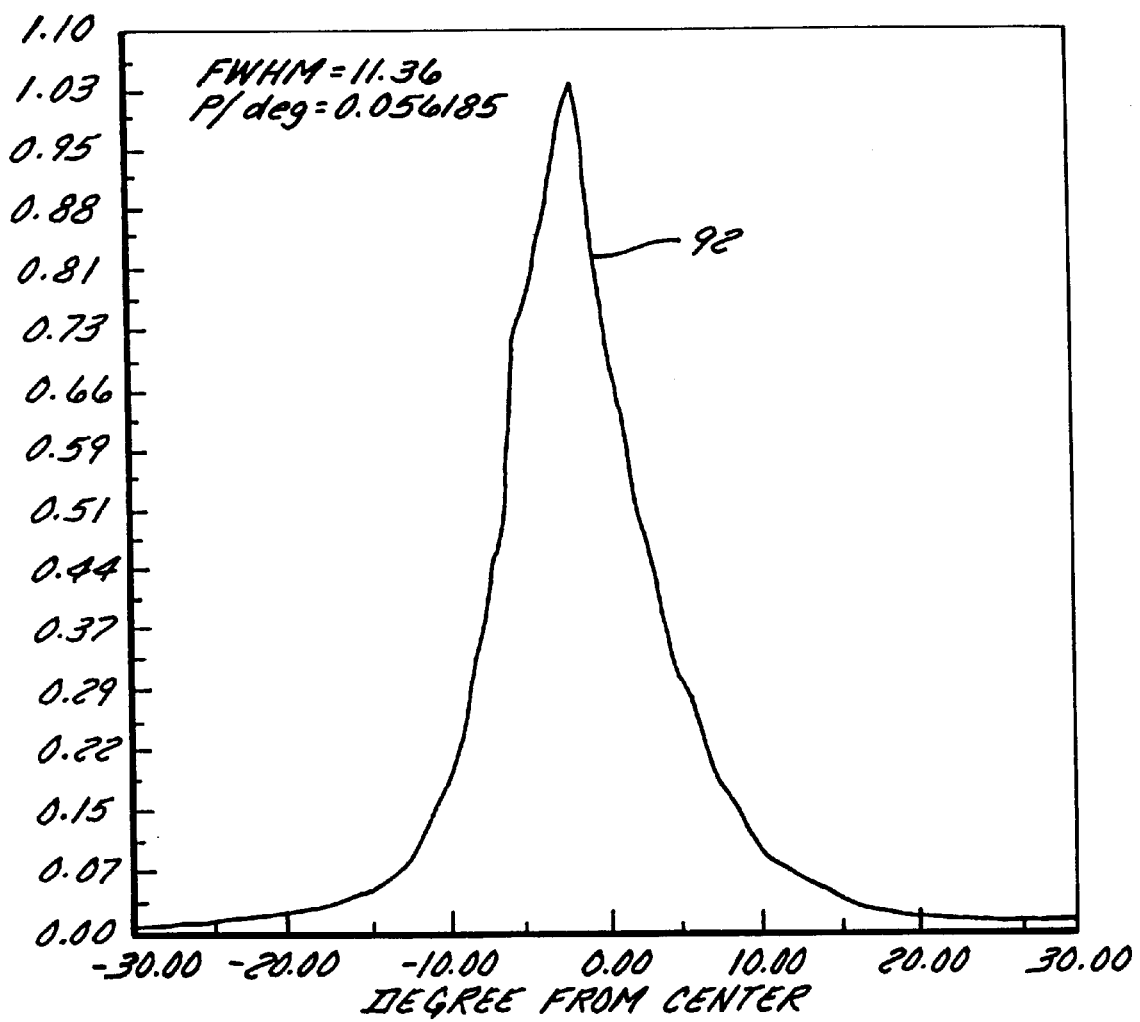
FIG. 7 is a graph plotting the light diffusing angular distribution of a cast sol-gel monolithic glass LSD.

The surface LSD produced by this process has a surface roughness with modulations ranging from 1 $\mu$m to 100 $\mu$m and with a detail structure of 10–50 $\mu$m in the lateral dimension. An example of an LSD produced in this manner has a diffusing angle of approximately 10° to 15° as can be seen by the curve 92 in FIG. 7.

Depending upon the application, cast and embossed LSDs can be produced with a range of diffusing angles of approximately 0.1° to 60°. Because the LSD is formed in a true glass, it is capable of withstanding temperatures of above 1000° C.— dramatically higher than the 100–150° C. glass transition temperature of conventional plastic LSDs. Its exit surface also can be formed (by molding), ground, and/or polished to produce a three-dimensional lens. AR and other coatings also can be applied by conventional hot coating techniques without harming the glass. Moreover, as discussed above in conjunction with FIG. 3, the glass surface LSD exhibits dramatically improved transmissibility at low wavelengths then than does a conventional plastic LSD.

If the process of casting is utilized to form the glass surface LSD, rubber material utilized as an insert into the mold or as the mold material itself offers a number of benefits over a mold or mold insert formed from a substantially rigid material such as a metal shim or a plastic material. As noted above, the viscosity of the sol-gel material when injected or inserted into a hard plastic mold must be held at a very precise viscosity in order for the light shaping structures to be replicated into the sol-gel material during the casting process. A rubber material provides for better depth and better feature replication due to the flexibility of the rubber as opposed to the substantially rigid material such as plastic or metal. Additionally, if heat is used during the aging process and during the heat treating process, the characteristics of the material change dramatically and can cause the sol-gel material to separate from the surfaces of the mold or mold insert. If this happens, the surface features are not replicated accurately or as deeply as is necessary. However, if rubber is utilized as the insert or as the mold material, the mold or insert can yield slightly to remain in contact with the sol-gel material as it shifts or shrinks during the aging and heat treating processes thereby producing a much better resolution of the replicated surface structures.

Additionally, the use of rubber as the mold insert or as the mold material directly also eliminates one subgeneration step in the production of the diffuser submaster from which the light shaping structures are replicated into the glass LSD. By eliminating one subgeneration step, less degeneration and thus a higher resolution light shaping surface structures are formed in the final glass LSD product.

Many changes and modifications may be made to the invention without departing from the spirit thereof. The scope of some of these changes are discussed above. The scope of the remaining changes will become apparent from the appended claims.

What is claimed is:

1. A method of making a light shaping surface diffuser, the method comprising the steps of:

providing a diffuser submaster of a relatively soft flexible material with at least a first surface and having a plurality of light shaping structures carried on the first surface;

forming a monolithic oxide glass substrate from a solution of a sol-gel material comprising;
 recording the plurality of light shaping structures from the diffuser submaster onto a surface of the glass substrate; and
 heat treating the glass substrate at a temperature greater than or equal to approximately 1000° C.

2. The method according to claim 1, wherein the step of forming further comprises:
 preparing the solution from a metal alkoxide, an amount of water and a solvent;
 causing a sol-to-gel transition of the solution to form a gel;
 aging the gel to produce a porous glass; and
 heat treating the porous glass to form the glass substrate as a generally non-porous, consolidated glass.

3. The method according to claim 1, wherein the step of forming further comprises:
 providing a precursor solution of tetraethylorthosilicate in ethanol;
 partially hydrolyzing the precursor solution with water containing approximately 1-% hydrochloric acid at room temperature for about one hour to produce a partially hydrolyzed solution;
 casting the partially hydrolyzed solution in a casting mold;
 aging the partially hydrolyzed solution to form a gel;
 further aging the gel to produce a porous glass; and
 heat treating the porous glass to form the glass substrate as a generally non-porous, consolidated glass.

4. The method according to claim 3, wherein the step of further aging the gel is carried out for at least one week.

5. The method according to claim 1, further comprising the steps of:
 preparing the solution from a metal alkoxide, an amount of water and a solvent;
 causing a sol-to-gel transition of the solution to form a gel;
 aging the gel to produce a porous glass;
 embossing the plurality of light shaping structures onto the gel as the step of recording; and
 heat treating the porous glass to form the glass substrate as a generally non-porous, consolidated glass.

6. The method according to claim 1, further comprising the steps of:
 preparing the solution from a metal alkoxide, an amount of water and a solvent;
 providing the diffuser submaster in a mold cavity;
 adding the solution to the mold cavity so that the solution contacts the plurality of light shaping structures on the diffuser master;
 causing a sol-to-gel transition of the solution to form a gel;
 aging the gel to produce a porous glass and to cast the plurality of light shaping structures onto the porous glass as the step of recording; and
 heat treating the porous glass to form the glass substrate as a generally non-porous, consolidated glass.

7. The method according to claim 1, further comprising the steps of:
 providing a base substrate;
 preparing the solution from a metal alkoxide, an amount of water and a solvent;
 coating a portion of the base substrate with a film layer of the solution;
 causing a sol-to-gel transition of the film layer to form a gel;
 aging the gel to produce a porous glass;
 pressing the diffuser sub-master against the film layer during the step of aging to emboss the plurality of light shaping structures onto the film layer as the step of recording; and
 heat treating the porous glass to form the glass substrate as a generally non-porous, consolidated glass layer on the base substrate.

8. The method according to claim 7, wherein the step of providing further comprises providing a base substrate of a glass material.

9. The method according to claim 1, further comprising the steps of:
 providing a base substrate;
 preparing the solution from a metal alkoxide, an amount of water and a solvent;
 coating at least one surface of the base substrate with a film layer of the solution;
 causing a sol-to-gel transition of the film layer to form a gel;
 heating the gel to a temperature of between about 70° C. and about 120° C. for between about 4 and 7 hours;
 aging the gel to produce a porous glass;
 pressing the diffuser sub-master against the film layer during the step of aging to emboss the plurality of light shaping structures onto the film layer as the step of recording;
 heat treating the porous glass to form the glass substrate as a generally non-porous, consolidated glass layer on the base substrate.

10. The method according to claim 9, further comprising the step of:
 simultaneously performing the steps of pressing and heating during the step of aging.

11. The method according to claim 1, further comprising the steps of:
 preparing the solution from a metal alkoxide, an amount of water and a solvent;
 causing a sol-to-gel transition of the solution to form a gel;
 aging the gel to produce a porous glass; and
 heat treating the porous glass at a temperature of between about 1000° C. and about 1050° C. to form the glass substrate as a generally non-porous, consolidated, sintered glass.

12. The method according to claim 1, further comprising the steps of:
 recording the plurality of light shaping structures on at least an entrance surface of the glass substrate; and
 forming a curved surface as a three dimensional lens on an exit surface of the glass substrate.

13. A method of making a surface light shaping diffuser, the method comprising the steps of:
 providing a diffuser submaster of a relatively soft flexible rubber material with at least a first surface and having a plurality of light shaping structures carried on the first surface;
 preparing a sol-gel solution from a metal alkoxide, an amount of water and a solvent;

causing a sol-to-gel transition of the sol-gel solution to form a gel;

aging the gel to produce a porous glass;

pressing the first surface of the diffuser submaster into contact with the gel during the step of aging to record the plurality of light shaping structures onto a surface of the porous glass;

separating the submaster diffuser from the porous glass; and heat treating the porous glass at a temperature greater than or equal to approximately 1000° C. to form a generally non-porous and consolidated monolithic glass substrate.

14. A method of making a surface light shaping diffuser, the method comprising the steps of:

providing a diffuser submaster of a relatively soft flexible rubber material with at least a first surface and having a plurality of light shaping structures carried on the first surface;

preparing a sol-gel solution from a metal alkoxide, an amount of water and a solvent;

coating a film layer of the sol-gel solution onto a base substrate;

causing a sol-to-gel transition of the film layer to form a gel;

aging the film layer to produce a porous glass layer;

pressing the first surface of the diffuser submaster into contact with the film layer during the step of aging to record the plurality of light shaping structures onto the porous glass film layer;

separating the submaster diffuser from the porous glass layer; and heat treating the porous glass layer at a temperature greater than or equal to approximately 1000° C. to form a generally non-porous and consolidated monolithic glass layer on the base substrate.

15. The method according to claim 14, wherein the step of aging further comprises the step of:

heating the film layer to a temperature of between about 70° C. and about 120° C.

16. The method according to claim 14, wherein the step of aging further comprises the steps of:

heating the film layer to a temperature of between about 70° C. and about 120° C.; and simultaneously performing the step of pressing.

17. A method of making a surface light shaping diffuser, the method comprising the steps of:

providing a casting mold having a diffuser submaster surface on at least a portion of an interior surface of the mold, wherein the diffuser submaster surface is of a relatively soft flexible rubber material having a plurality of light shaping structures carried thereon;

preparing a sol-gel solution from a metal alkoxide, an amount of water and a solvent;

inserting the sol-gel solution into the casting mold so that the plurality of light shaping structures contact the sol-gel solution;

causing a sol-to-gel transition of the sol-gel solution to form a gel;

aging the film layer to produce a porous glass having the plurality of light shaping structures recorded onto a surface of the porous glass; and heat treating the porous glass at a temperature greater than or equal to approximately 1000° C. to form a generally non-porous and consolidated monolithic glass substrate.

18. The method according to claim 17, wherein the step of providing further comprises the steps of:

providing a mold insert as the diffuser submaster surface; and placing the mold insert into the casting mold.

19. The method according to claim 17, wherein the step of providing further comprises the step of:

providing a casting mold formed from the relatively soft flexible rubber material wherein the plurality of light shaping structures are integrally carried on the interior surface of the mold.

20. A surface light shaping diffuser formed by the process of claim 1.

21. A surface light shaping diffuser formed by the process of claim 13.

22. A surface light shaping diffuser formed by the process of claim 14.

23. A surface light shaping diffuser formed by the process of claim 17.

* * * * *